US008139580B2

(12) United States Patent
Chen et al.

(10) Patent No.: US 8,139,580 B2

(45) Date of Patent: Mar. 20, 2012

(54) SYSTEM AND METHOD FOR PROVIDING MULTICAST AND BROADCAST SERVICES

(75) Inventors: You-Lin Chen, Yuanlin Township (TW); Jen-Shun Yang, Zhubei (TW); Shiao-Li Tsao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 82 days.

(21) Appl. No.: 12/260,217

(22) Filed: Oct. 29, 2008

(65) Prior Publication Data

US 2009/0213957 A1 Aug. 27, 2009

Related U.S. Application Data

(60) Provisional application No. 61/064,293, filed on Feb. 27, 2008.

(51) Int. Cl.
*H04L 12/28* (2006.01)

(52) U.S. Cl. ......................... 370/390; 370/351; 370/389

(58) Field of Classification Search .................. 370/351, 370/389, 390

See application file for complete search history.

(56) References Cited

U.S. PATENT DOCUMENTS

2006/0007849 A1* 1/2006 Kim et al. .................... 370/208
2007/0191024 A1* 8/2007 Kim et al. .................. 455/456.2
2007/0268933 A1* 11/2007 Wu et al. ....................... 370/474
2008/0259878 A1* 10/2008 Connors et al. ............... 370/336
2008/0311902 A1* 12/2008 Diepstraten et al. ....... 455/426.1
2009/0034459 A1* 2/2009 Shousterman et al. ....... 370/329
2009/0086670 A1* 4/2009 Hart et al. ..................... 370/329

OTHER PUBLICATIONS

Wang et al, System Architecture and Cross-Layer Optimization of Video Broadcast over WiMax, IEEE Journal of Selected Areas in Communications, vol. 25, No. 4, May 2007.*
Desset et al, WiMax Downlink OFDMA Burst Placement for Optimized Receiver Duty-Cycling, IEEE Communications Society Subject Matter experts for publication in the ICC 2007 Proceedings.*
Sanida Omerovic, WiMax Overview, 2006.*

* cited by examiner

*Primary Examiner* — Hassan Phillips
*Assistant Examiner* — Gautam Sharma
(74) *Attorney, Agent, or Firm* — Finnegan, Henderson, Farabow, Garrett & Dunner, LLP

(57) ABSTRACT

A method for providing a multicast and broadcast service (MBS) by transmitting a plurality of data frames in a wireless network. The method includes: generating a first MBS data information element (MBS-DATA-IE) in a first one of the data frames, the first MBS-DATA-IE including information relating to a logical channel of the MBS, and indicating a location of an MBS map (MBS-MAP) in a second one of the data frames; determining ones of the data frames between the first and second ones of the data frames in which to add a plurality of extra MBS-DATA-IEs; and generating the extra MBS-DATA-IEs, the extra MBS-DATA-IEs being generated in the determined ones of the data frames and including information relating to the logical channel.

35 Claims, 10 Drawing Sheets

SYSTEM AND METHOD FOR PROVIDING MULTICAST AND BROADCAST SERVICES

RELATED APPLICATIONS

This application is based upon and claims the benefit of priority from U.S. Provisional Patent Application No. 61/064,293, filed Feb. 27, 2008, the entire contents of which are incorporated herein by reference.

TECHNICAL FIELD

This invention pertains in general to systems and methods for providing multicast and broadcast services (MBSs) in a wireless network.

BACKGROUND

Wireless communications operating according to a predetermined protocol have gained worldwide popularity. The advantages of the wireless medium include the capacity to address broad geographic areas without expensive infrastructure development such as running cables. The broadband wireless access industry often is guided by IEEE standard 802.16 for wide area networks.

Worldwide Interoperability for Microwave Access (WiMAX) is a wireless communications technology for providing wireless data based on the IEEE standard 802.16. A WIMAX network provides an alternative to cabled access networks, such as a digital subscriber line (DSL). In addition, the WiMAX technology may provide fixed, nomadic, portable, and mobile wireless broadband connectivity to a base station.

The IEEE standard 802.16 supports a multicast and broadcast service (MBS), which can provide service data to a plurality of users who desire to receive the same service in the WiMAX network. For example, the service data may be movies, games, or TV programs, and is usually stored on one or more MBS servers. A mobile station (MS), such as a mobile phone or a laptop computer, subscribing to an MBS may receive data relating to the MBS through access to one or more base stations (BSs) in the WiMAX network.

Typically, MBS data is transmitted in data frames from the BS to the MS. For example, according to the IEEE standard 802.16, a data frame may include a downlink map (DL-MAP), an MBS map (MBS-MAP), a plurality of MBS data bursts including content of MBSs delivered by the BS, and other information. The DL-MAP includes an MBS-MAP information element (MBS-MAP-IE), which indicates in the data frame a location of the MBS-MAP based on, e.g., symbol offsets, and provides information for the MS to perform synchronization with the MBS-MAP. In other words, based on the MBS-MAP-IE, the MS may know when to read the MBS-MAP.

The MBS-MAP includes one or more MBS data information elements (MBS-DATA-IEs) or extended MBS data information elements (Extended MBS-DATA-IEs), collectively referred to herein as MBS-DATA-IEs, which provide access information for MBS data bursts in the data frames. For example, MBS data is typically transmitted on a plurality of logical channels of the MBS, and each of the MBS-DATA-IEs provides a connection identifier for one of the plurality of logical channels. Also for example, a first one of the MBS-DATA-IEs indicates in the data frames a location of an MBS data burst corresponding to a first one of the logical channels based on, e.g., frame and symbol offsets. The first one of the MBS-DATA-IEs also indicates in the data frames a location of a next MBS-MAP including information relating to the first one of the logical channels. Based on the first one of the MBS-DATA-IEs, the MS may know when to read the MBS data burst corresponding to the first one of the logical channels, and know when to read the next MBS-MAP including the information regarding the first one of the logical channels.

FIG. 1 illustrates a conventional MBS data structure 100, according to the IEEE standard 802.16. The MBS data structure 100 includes a plurality of data frames 101 transmitted by the BS. For example, the BS may deliver content of a first TV program on the first one of the logical channels, content of a second TV program on a second one of the logical channels, and content of a movie on a third one of the logical channels. For convenience of illustration, only MBS-MAP-IEs, MBS-MAPs, MBS-DATA-IEs, and MBS data bursts that relate to the first, second, and third logical channels are labeled on the MBS data structure 100 in FIG. 1.

Referring to FIG. 1, the MBS data structure 100 includes MBS-MAP-IEs 102, 104, 106, MBS-MAPs 112, 114, 116, and a plurality of data bursts 122-i (i=1, 2, 3), 124-i (i=1, 2), 126-i (i=1, 2, 3). The MBS-MAPs 112, 114, 116 further include MBS-DATA-IEs 112-i (i=1, 2, 3), 114-i (i=1, 2), and 116-i (i=1, 2, 3), respectively. The MBS-DATA-IEs 112-1, 114-1, 116-1 and the MBS data bursts 122-1, 124-1, 126-1 relate to the first logical channel. The MBS-DATA-IEs 112-2, 114-2, 116-2 and the MBS data bursts 122-2, 124-2, 126-2 relate to the second logical channel. The MBS-DATA-IEs 112-3, 116-3 and the MBS data bursts 122-3, 126-3 relate to the third logical channel.

The MBS-MAP-IEs 102, 104, and 106 indicate locations of the MBS-MAPs 112, 114, and 116 in the data frames 101, respectively, which is illustrated by the dashed arrows in FIG. 1. Based on the MBS-MAP-IE 102, the MS may know when to read the MBS-MAP 112. Based on the MBS-MAP-IE 104, the MS may know when to read the MBS-MAP 114. Based on the MBS-MAP-IE 106, the MS may know when to read the MBS-MAP 116.

The MBS-DATA-IEs 112-1, 114-1, and 116-1 provide for the first logical channel a connection identifier, and indicate in the data frames 101 locations of the MBS data bursts 122-1, 124-1, and 126-1, respectively. In addition, the MBS-DATA-IE 112-1 in the MBS-MAP 112 indicates in the data frames 101 a location of the next MBS-MAP 114 including the MBS-DATA-IE 114-1. The MBS-DATA-IE 114-1 further indicates a location of the next MBS-MAP 116 including the MBS-DATA-IE 116-1. These indications are also illustrated by the dashed arrows in FIG. 1.

The MS may acquire MBS-MAP synchronization, i.e., locate in the data frames 101 an MBS-MAP that includes information relating to one of the logical channels on which desired content is delivered, by reading MBS-MAP-IEs in the data frames 101. For example, if the MS wants to receive the content on the first logical channel, the MS may know when to read the MBS-MAP 112 based on the MBS-MAP-IE 102. Based on the MBS-DATA-IE 112-1 in the MBS-MAP 112, the MS may know when to read the MBS data burst 122-1 and the next MBS-MAP 114 including the MBS-DATA-IE 114-1. Similarly, based on the MBS-DATA-IE 114-1, the MS may further know when to read the MBS data burst 124-1 and the next MBS-MAP 116 including the MBS-DATA-IE 116-1. In this way, the MS may read the MBS data bursts 122-1, 124-1, 126-1, which include the content delivered on the first logical channel. Similarly, the MS may read the MBS data bursts 122-2, 124-2, 126-2, which include the content delivered on the second logical channel, or the MBS data bursts 122-3, 126-3, which include the content delivered on the third logical channel.

In reality, the MS may miss the MBS-MAP 112 in the data frames 101 transmitted by the BS. For example, the MS that wants to receive the content delivered on the first logical channel may initially establish connection to the BS at a time after the MBS-MAP-IE 102 is transmitted. Also for example, the MS may switch to the first logical channel from another logical channel at a time after the MBS-MAP-IE 102 is transmitted. As a result, the MS needs to wait for a next MBS-MAP relating to the first channel, i.e., the MBS-MAP 114, to acquire MBS-MAP synchronization. Based on the MBS-DATA-IE 114-1 in the MBS-MAP 114, the MS may further read the MBS data burst 124-1 and following MBS data bursts.

As a result, power is consumed when the MS searches for the MBS-DATA-IE 114-1 in the data frames 101. A relatively long period of MBS-MAP synchronization in the MS may result in relatively high power consumption. For example, according to the IEEE standard 802.16, the MBS-MAP 114 could be transmitted several frames later than the MBS-MAP 112.

SUMMARY

Consistent with the invention, there is provided a method for providing a multicast and broadcast service (MBS) by transmitting a plurality of data frames in a wireless network, the method comprising: generating a first MBS data information element (MBS-DATA-IE) in a first one of the data frames, the first MBS-DATA-IE including information relating to a logical channel of the MBS, and indicating a location of an MBS map (MBS-MAP) in a second one of the data frames; determining ones of the data frames between the first and second ones of the data frames in which to add a plurality of extra MBS-DATA-IEs; and generating the extra MBS-DATA-IEs, the extra MBS-DATA-IEs being generated in the determined ones of the data frames and including information relating to the logical channel.

Also consistent with the invention, there is provided a method for providing a multicast and broadcast service (MBS) by transmitting a plurality of data frames in a wireless network, the method comprising: generating a first MBS data information element (MBS-DATA-IE) in a first one of the data frames, the first MBS-DATA-IE including information relating to a logical channel of the MBS, and indicating a location of an MBS map (MBS-MAP) in a second one of the data frames; and generating an extra MBS-DATA-IE in a third one of the data frames between the first and second ones of the data frames, the extra MBS-DATA-IE including information relating to the logical channel.

Further, and consistent with the invention, there is provided a communication system for providing a multicast and broadcast service (MBS) by transmitting a plurality of data frames in a wireless network, the system being configured to: generate a first MBS data information element (MBS-DATA-IE) in a first one of the data frames, the first MBS-DATA-IE including information relating to a logical channel of the MBS, and indicating a location of an MBS map (MBS-MAP) in a second one of the data frames; determine ones of the data frames between the first and second ones of the data frames in which to add a plurality of extra MBS-DATA-IEs; and generate the extra MBS-DATA-IEs, the extra MBS-DATA-IEs being generated in the determined ones of the data frames and including information relating to the logical channel.

Further, and consistent with the invention, there is provided a computer-readable storage medium including instructions, executable by a processor in a communication system, for performing a method for providing a multicast and broadcast service (MBS) by transmitting a plurality of data frames in a wireless network, the method comprising: generating a first MBS data information element (MBS-DATA-IE) in a first one of the data frames, the first MBS-DATA-IE including information relating to a logical channel of the MBS, and indicating a location of an MBS map (MBS-MAP) in a second one of the data frames; determining ones of the data frames between the first and second ones of the data frames in which to add a plurality of extra MBS-DATA-IEs; and generating the extra MBS-DATA-IEs, the extra MBS-DATA-IEs being generated in the determined ones of the data frames and including information relating to the logical channel.

Also consistent with the invention, there is provided a method for providing a multicast and broadcast service (MBS) by transmitting a plurality of data frames in a wireless network, the method comprising: generating a first MBS data information element (MBS-DATA-IE) in a first one of the data frames; generating a second MBS-DATA-IE in a second one of the data frames; and generating an extra MBS-DATA-IE in a data frame between the first and second ones of the data frames.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Figure 1:
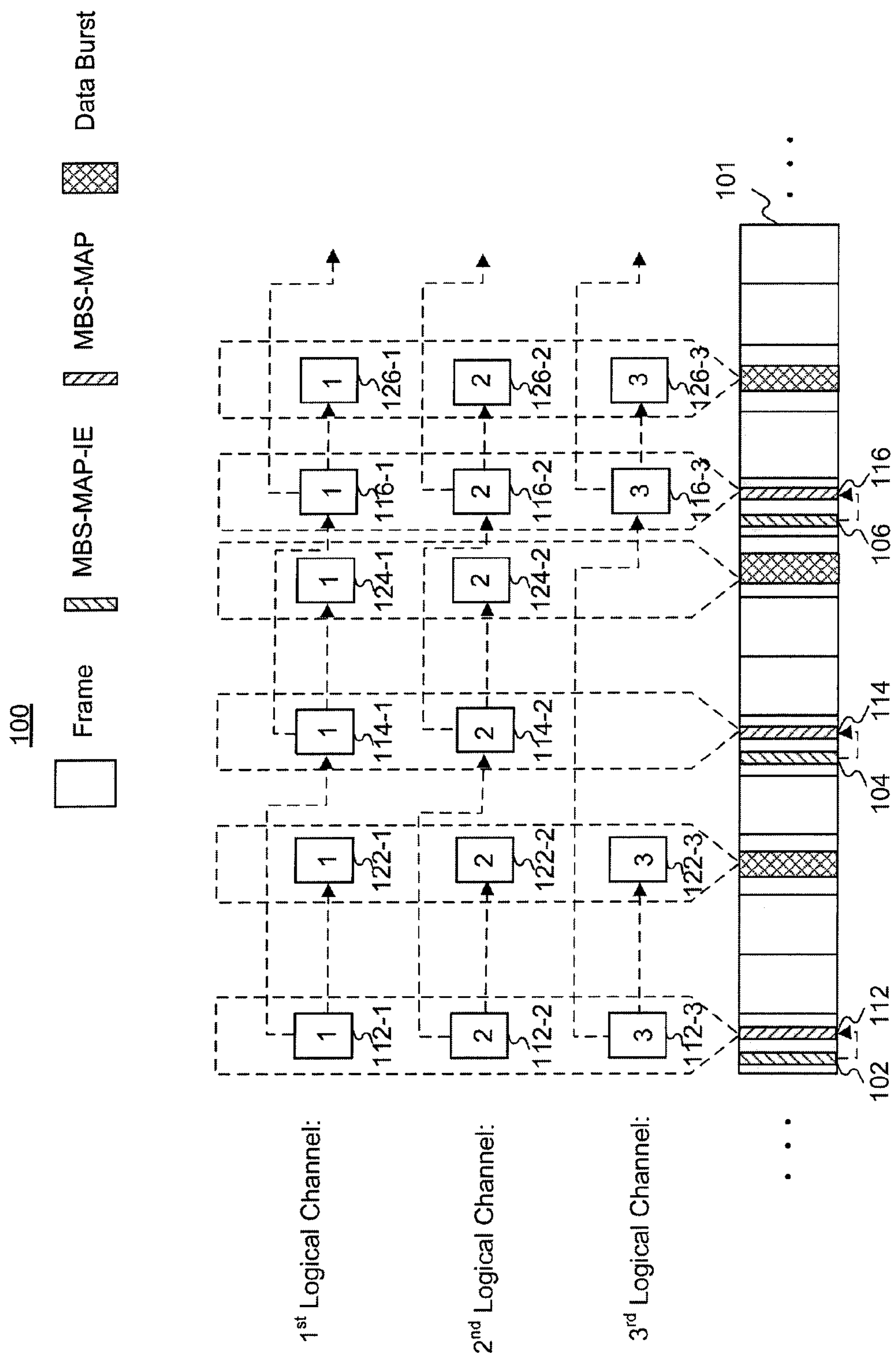
FIG. 1 illustrates a conventional MBS data structure, according to the IEEE standard 802.16.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments consistent with the present invention, there is provided a method for a communication system, such as a base station (BS) or an Access Service Network Gateway (ASN-GW), to provide a multicast and broadcast service (MBS) to a mobile station (MS). When receiving the MBS provided based on the method, the MS may reduce power consumption.

In exemplary embodiments consistent with the present invention, there is provided a computer-readable storage medium including instructions, executable by a processor in a communication system, for performing a method to provide a multicast and broadcast service (MBS) to a mobile station (MS). When receiving the MBS provided based on the method, the MS may reduce power consumption.

For example, the MS may reduce operation overhead when performing MBS map (MBS-MAP) synchronization, that is, locating in received data frames an MBS-MAP that includes information relating to a logical channel on which desired content is delivered. The MBS-MAP provides information for the MS to read in the data frames an MBS data burst regarding the desired content. Based on the MBS-MAP, the MS may know when to read the MBS data burst.

In exemplary embodiments consistent with the present invention, extra MBS data information elements (MBS-DATA-IEs) may be added in data frames to be transmitted to the MS. For example, the communication system providing the MBS, such as the BS or the ASN-GW, may determine a data transmission schedule for MBS data to be transmitted on a plurality of logical channels of the MBS, and generate the data frames based on the schedule. Each of the data frames may include an MBS-MAP generated based on a communication standard such as the IEEE standard 802.16. Ones of the MBS-MAPs each include an MBS-DATA-IE, referred to herein as original MBS-DATA-IE, relating to one of the logical channels, such as a logical channel LC0. Each of the extra MBS-DATA-IEs for the logical channel LC0 may be added in any of the MBS-MAPs that does not include an original MBS-DATA-IE for the logical channel LC0. In addition, each of the extra MBS-DATA-IEs may be any information element (IE) in an MBS-MAP, such as an Extended MBS-DATA-IE according to the IEEE standard 802.16.

In one exemplary embodiment, the MS may read one of the original MBS-DATA-IEs in the data frames to acquire MBS-MAP synchronization, and receive content delivered on the logical channel LC0. In one exemplary embodiment, the MS may read one of the extra MBS-DATA-IEs to acquire MBS-MAP synchronization.

In exemplary embodiments consistent with the present invention, there is also provided a method for the communication system to transmit additional information regarding the MBS using the extra MBS-MAP-IEs. For example, the additional information may be a retransmission of data previously transmitted to the MS. Also for example, the additional information may be redundancy data used for error detection in data previously transmitted to the MS. Therefore, the extra MBS-MAP-IEs may be used to support methods that enable recovery from transmission errors, such as the method known as Hybrid Automatic Repeat ReQuest (HARQ).

In exemplary embodiments consistent with the present invention, the communication system may include the additional information as data bursts in data frames. In addition, the communication system may use one of the extra MBS-DATA-IEs to indicate in the data frames a location of one of the data bursts including the additional information. Therefore, when the MS reads the extra MBS-DATA-IEs, the MS may further know locations of the data bursts including the additional information and, hence, receive the additional information.

In one exemplary embodiment, the MS may receive the content delivered on the logical channel LC0 without receiving the extra MBS-DATA-IEs for the logical channel LC0. As a result, the MS may not receive the additional information. For example, if the MS does not need the additional information, it does not need to waste power to read the extra MBS-DATA-IEs.

Figure 2A:
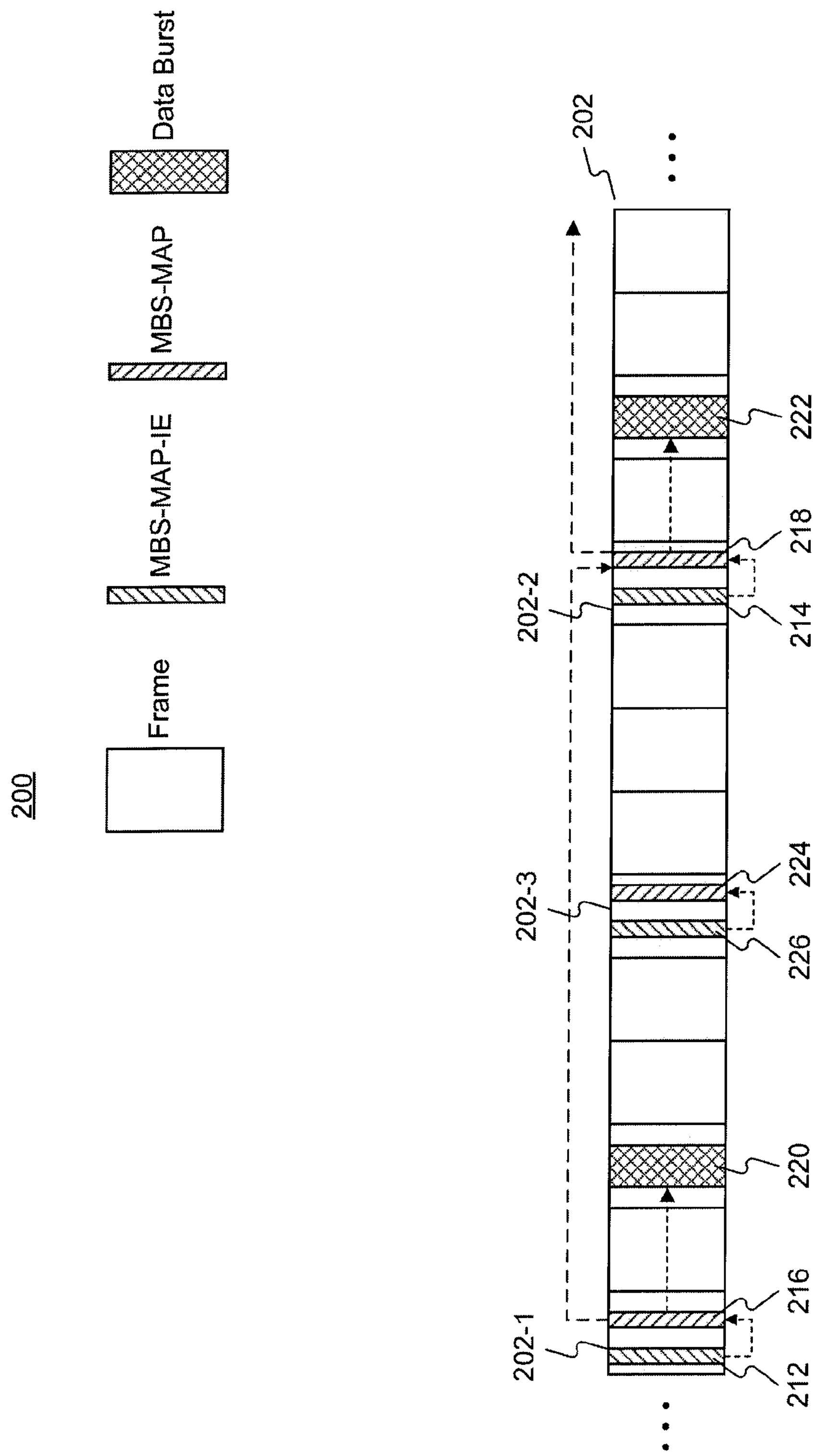
FIGS. 2A and 2B each illustrate a method to determine data frames to add extra MBS-DATA-IEs, according to exemplary embodiments.
Figure 2B:
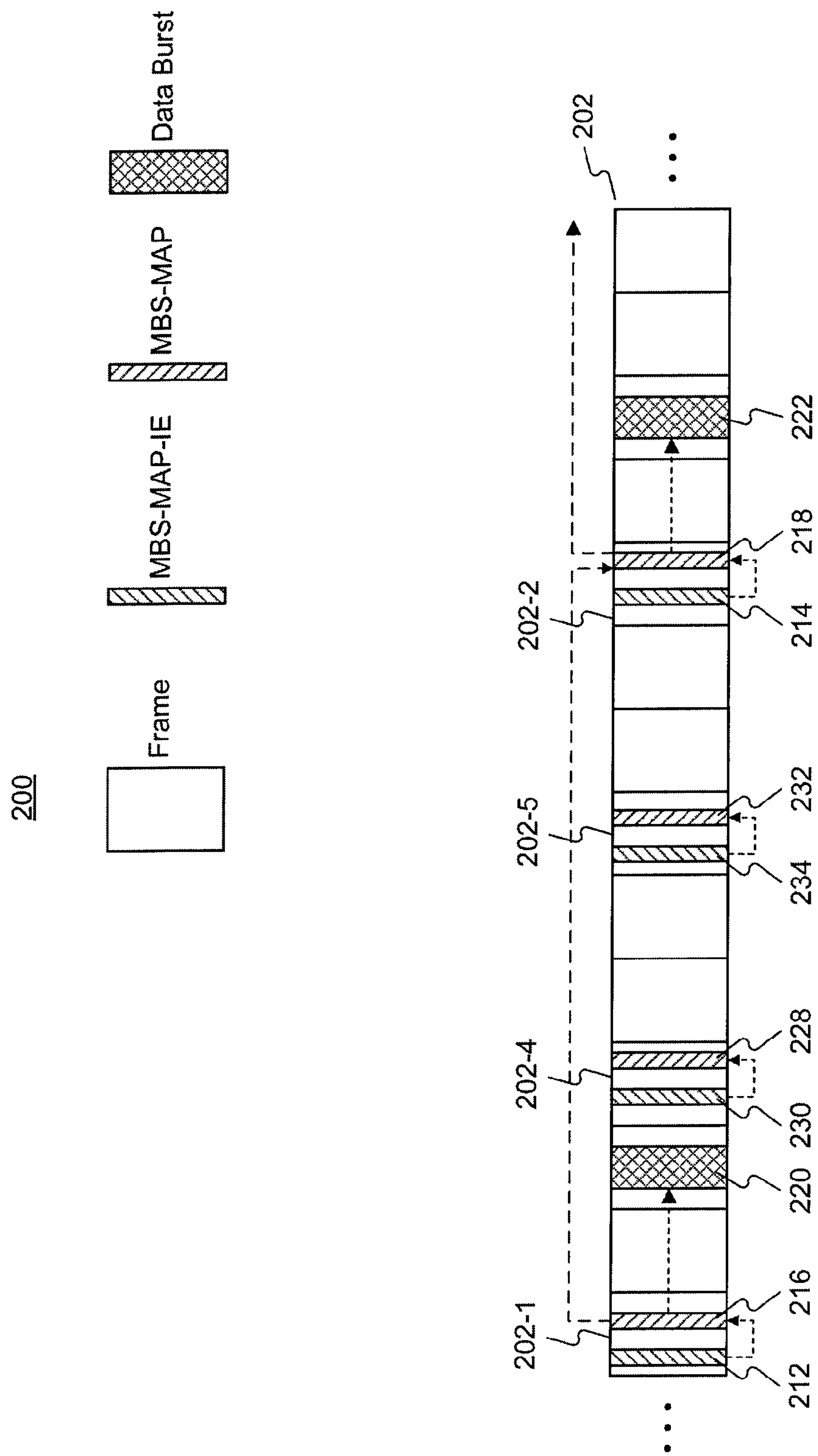

FIGS. 2A and 2B each illustrate a method 200 for the communication system to determine ones of the data frames in which to add the extra MBS-DATA-IEs for the logical channel LC0, according to exemplary embodiments. For convenience of illustration, only a portion of the data frames, data frames 202, are shown in FIGS. 2A and 2B. Further, only MBS-MAP-IEs, MBS-MAPs, and MBS data bursts that relate to the logical channel LC0 are labeled in FIGS. 2A and 2B.

Referring to FIGS. 2A and 2B, the data frames 202 include first and second MBS-MAP-IEs 212 and 214, first and second MBS-MAPs 216 and 218, and first and second MBS data bursts 220 and 222, which relate to the logical channel LC0. The MBS-MAP-IE 212 and the MBS-MAP 216 are included in a first one, 202-1, of the data frames 202. The MBS-MAP-IE 214 and the MBS-MAP 218 are included in a second one, 202-2, of the data frames 202.

For example, the MBS-MAP-IEs 212 and 214 indicate locations of the MBS-MAPs 216 and 218 in the data frames 202, respectively. The MBS-MAP 216 includes a first original MBS-DATA-IE (not shown) for the logical channel LC0. The first original MBS-DATA-IE indicates in the data frames 202 a location of the MBS data burst 220, and a location of a next MBS-MAP relating to the logical channel LC0, i.e., the MBS-MAP 218. Similarly, the MBS-MAP 218 includes a second original MBS-DATA-IE (not shown). The second original MBS-DATA-IE indicates in the data frames 202 a location of the MBS data burst 222, and a location of a next MBS-MAP (not shown) relating to the logical channel LC0.

In exemplary embodiments consistent with the present invention, the extra MBS-DATA-IEs for the logical channel LC0 may be added in any of the MBS-MAPs that does not include an original MBS-DATA-IE for the logical channel LC0. In other words, any one of the data frames 202 that does not include the first and second original MBS-DATA-IEs may be selected to include one of the extra MBS-DATA-IEs for the logical channel LC0.

In one exemplary embodiment, shown in FIG. 2A, a third one, 202-3, of the data frames 202 is selected to include one of the extra MBS-DATA-IEs for the logical channel LC0. For example, the third data frame 202-3 includes an MBS-MAP 224, and an MBS-MAP-IE 226 indicating a location of the MBS-MAP 224. The one of the extra MBS-DATA-IEs may be added in the MBS-MAP 224 and, hence, included in the data frame 202-3.

In one exemplary embodiment, shown in FIG. 2B, a fourth one, 202-4, of the data frames 202, and a fifth one, 202-5, of the data frames 202 are selected to include first and second ones of the extra MBS-DATA-IEs for the logical channel LC0, respectively. For example, the fourth data frame 202-4 includes an MBS-MAP 228, and an MBS-MAP-IE 230 indicating a location of the MBS-MAP 228. The first one of the extra MBS-DATA-IEs may be added in the MBS-MAP 228 and, hence, included in the data frame 202-4. Also for example, the fifth data frame 202-5 includes an MBS-MAP 232, and an MBS-MAP-IE 234 indicating a location of the MBS-MAP 232. The second one of the extra MBS-DATA-IEs may be added in the MBS-MAP 232 and, hence, included in the data frame 202-5.

Figure 2C:
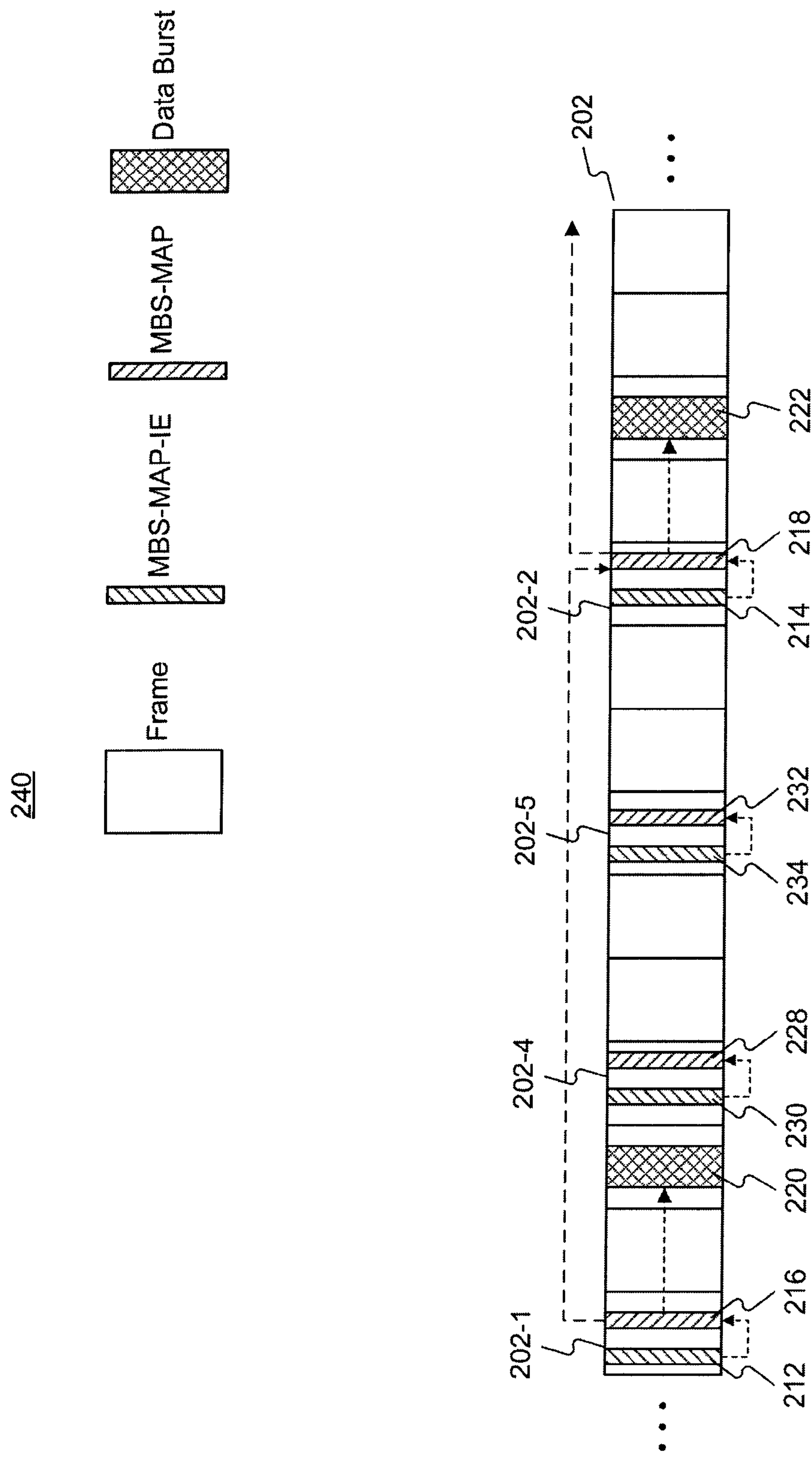
FIGS. 2C, 2D, and 2E each illustrate a method to determine MBS data burst indications for extra MBS-DATA-IEs, according to exemplary embodiments.
Figure 2D:
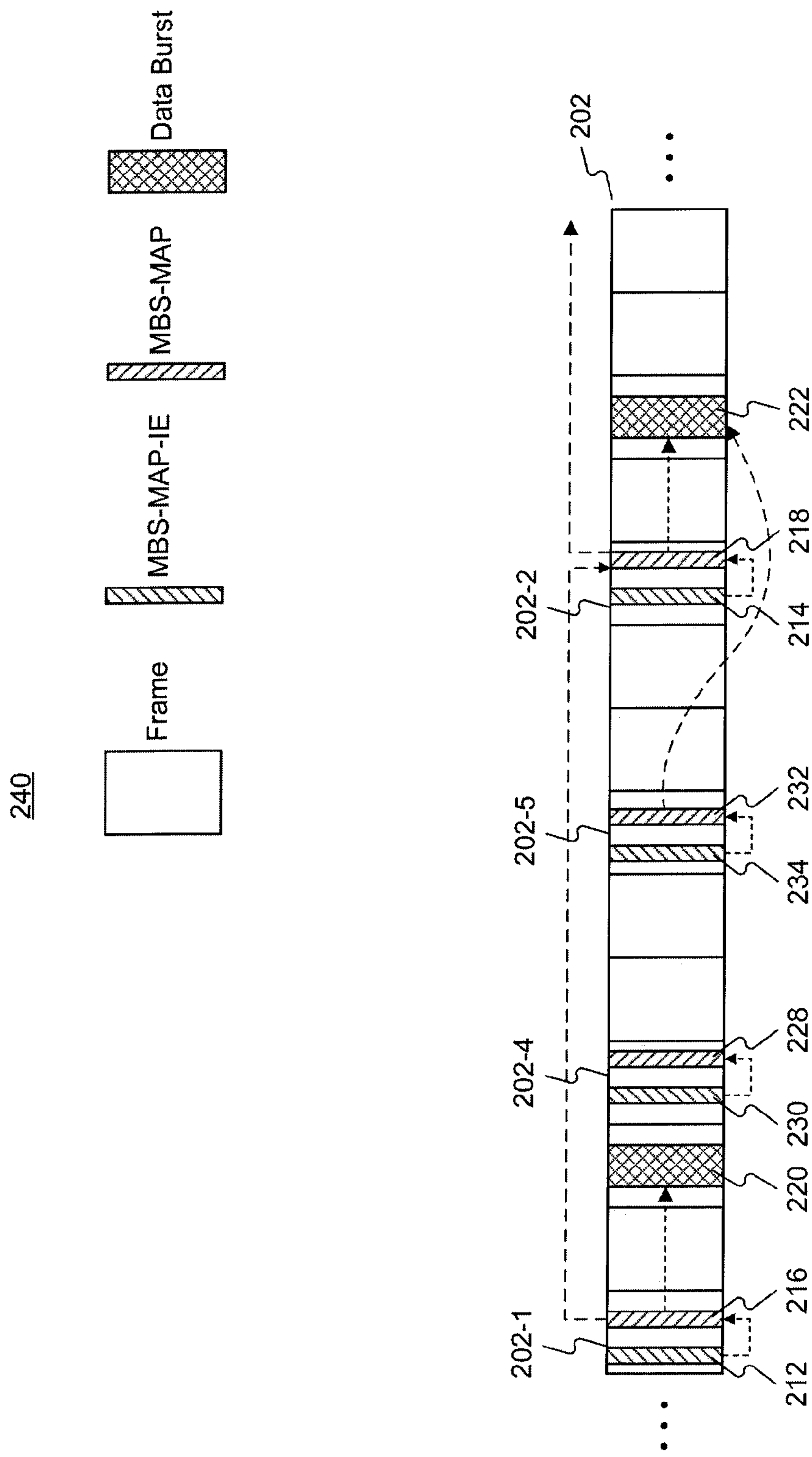
Figure 2E:
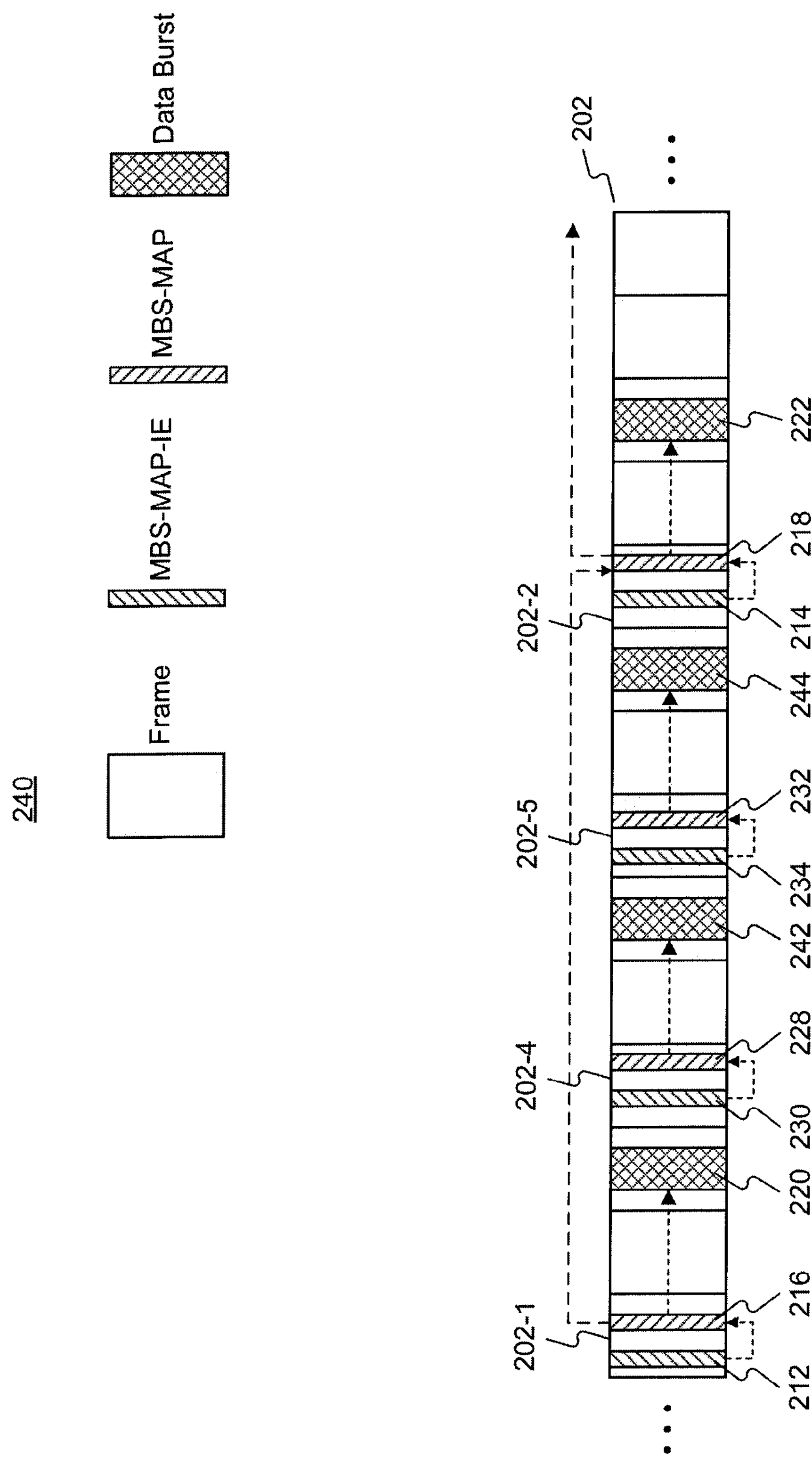

FIGS. 2C, 2D, and 2E each illustrate a method 240 to determine MBS data burst indications for the extra MBS-DATA-IEs for the logical channel LC0, according to exemplary embodiments. For example, the extra MBS-DATA-IEs may be the first and second extra MBS-DATA-IEs illustrated in FIG. 2B.

In one exemplary embodiment, shown in FIG. 2C, the first extra MBS-MAP-IE in the MBS-MAP 228 indicates no data burst, and the second extra MBS-MAP-IE in the MBS-MAP 232 indicates no data burst.

In one exemplary embodiment, shown in FIG. 2D, the first extra MBS-MAP-IE in the MBS-MAP 228 indicates no data burst, and the second extra MBS-MAP-IE in the MBS-MAP 232 indicates a location of the data burst 222.

In one exemplary embodiment, shown in FIG. 2E, the first extra MBS-DATA-IE in the MBS-MAP 228 indicates in the data frames 202 a location of a third data burst 242 including additional information relating to the logical channel LC0. The second extra MBS-DATA-IE in the MBS-MAP 232 indicates in the data frames 202 a location of a fourth data burst 244 also including additional information relating to the logical channel LC0. For example, the data burst 242 in the frame 202-4 may be a retransmission of previously transmitted data such as the data burst 220. Also for example, the data burst 244 in the frame 202-5 may be redundancy data used for error detection in previously transmitted data such as the data burst 220.

Figure 2F:
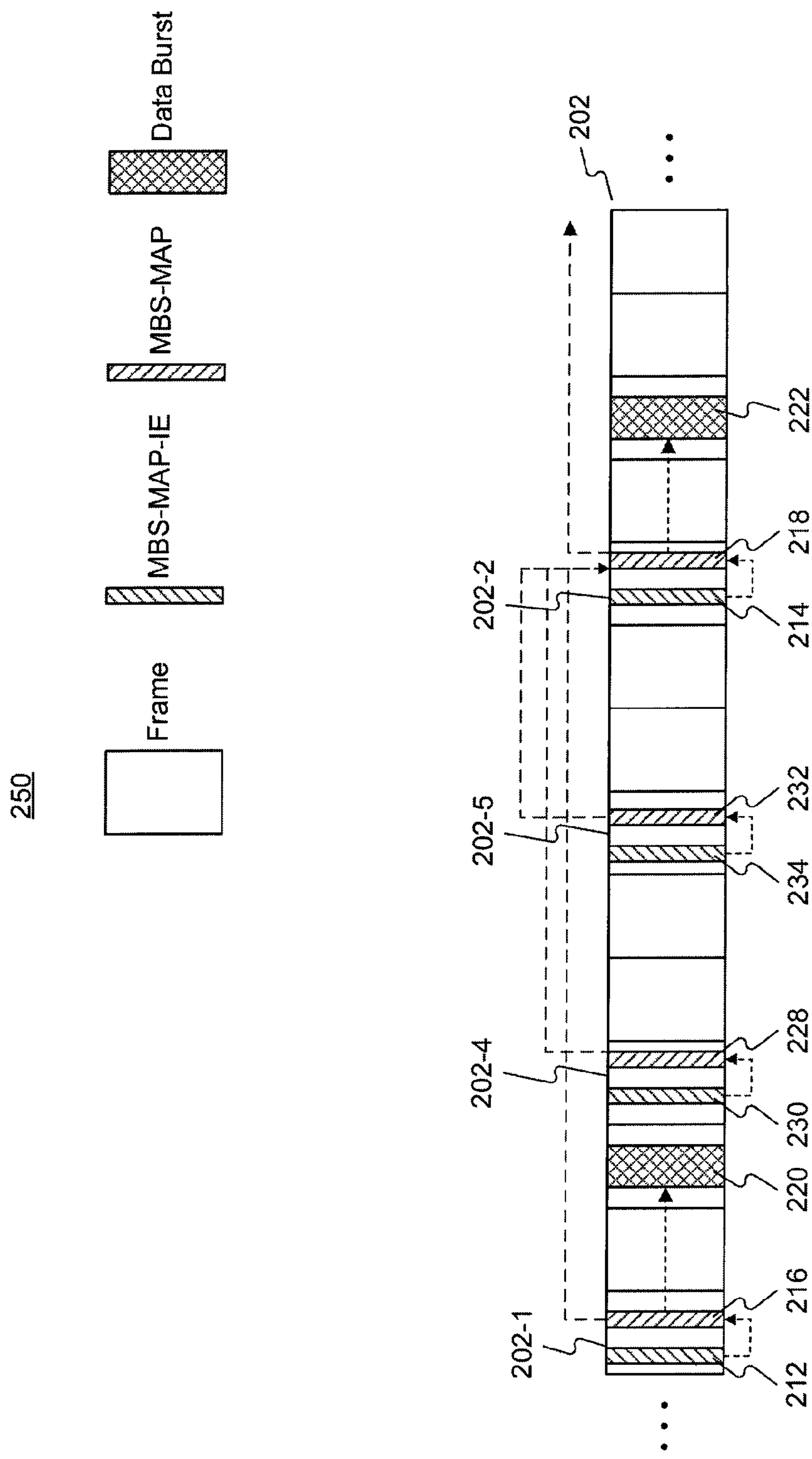
FIGS. 2F, 2G, and 2H each illustrate a method to determine MBS-MAP indications for extra MBS-DATA-IEs, according to exemplary embodiments.
Figure 2G:
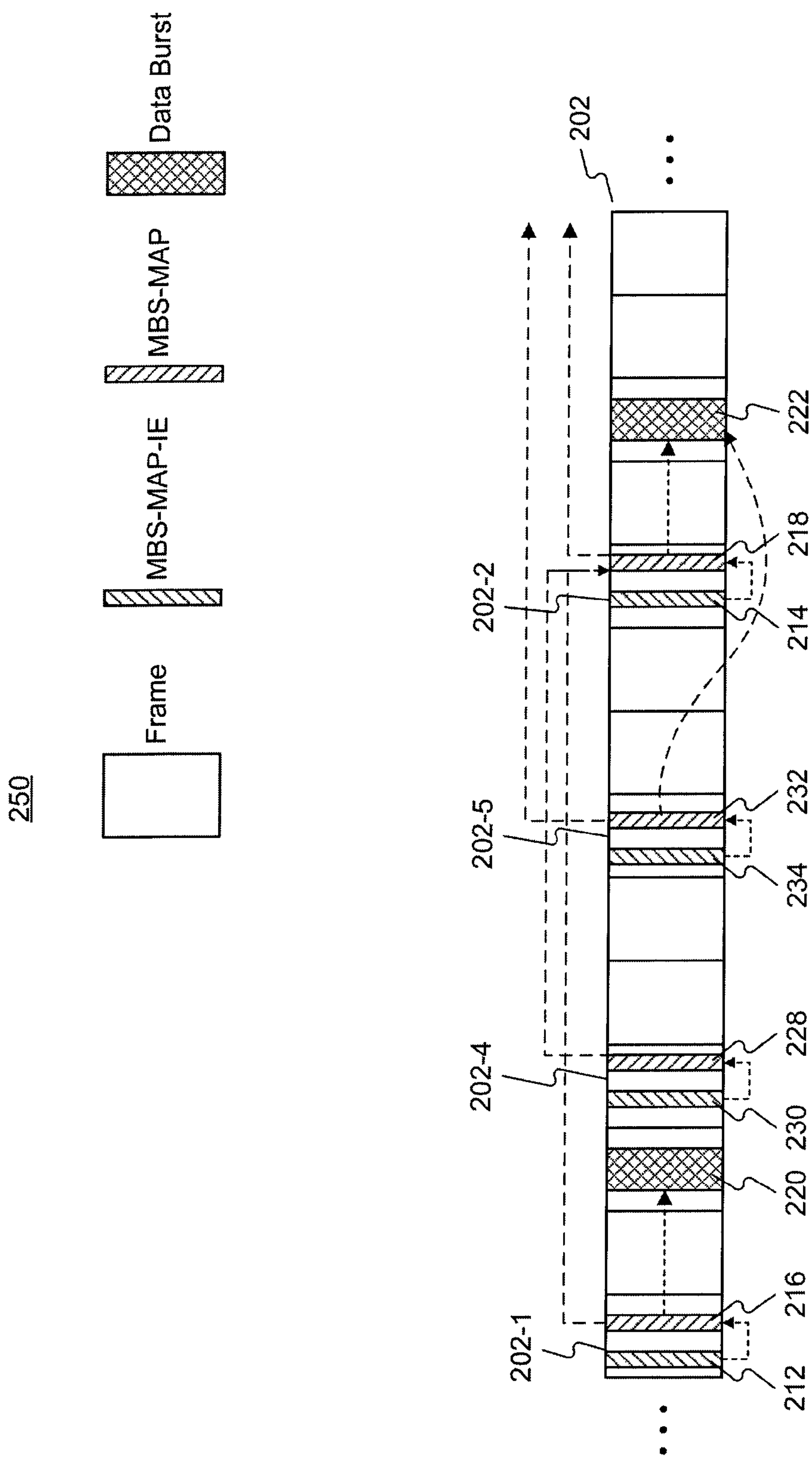
Figure 2H:
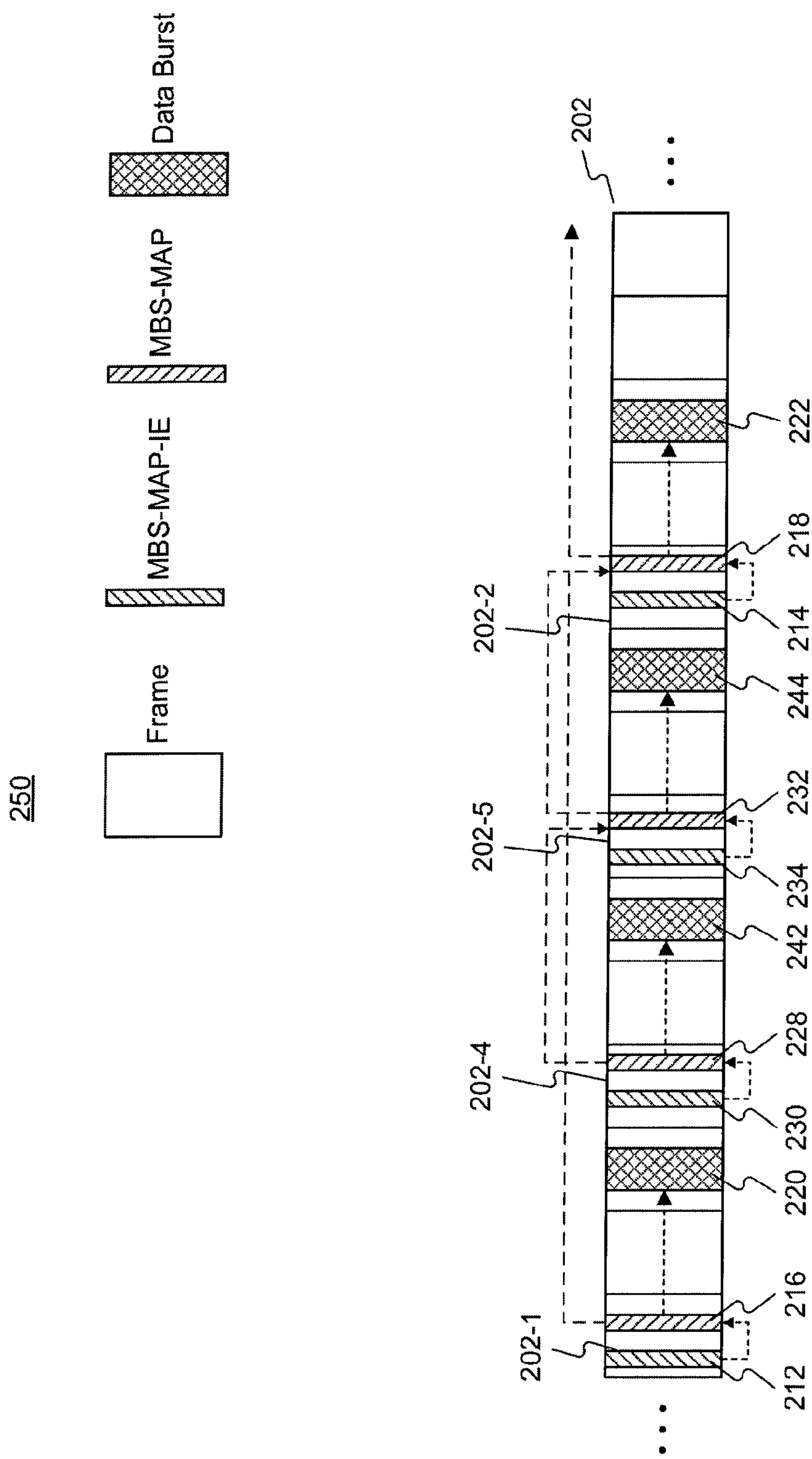

FIGS. 2F, 2G, and 2H each illustrate a method 250 to determine MBS-MAP indications for the first and second extra MBS-DATA-IEs respectively illustrated in FIGS. 2C, 2D, and 2E, according to exemplary embodiments.

In one exemplary embodiment, shown in FIG. 2F, the first extra MBS-DATA-IE in the MBS-MAP 228 indicates in the data frames 202 the location of the MBS-MAP 218, and the second extra MBS-MAP-IE in the MBS-MAP 232 also indicates the location of the MBS-MAP 218.

As a result, if the MS missed the first original MBS-DATA-IE for the logical channel LC0 in the MBS-MAP 216, the MS may search for a next MBS-DATA-IE for the logical channel LC0 in the data frames 202, until it reads the MBS-MAP-IE 230 in the data frame 202-4. Based on the MBS-MAP-IE 230, the MS may read the MBS-MAP 228 including the first extra MBS-DATA-IE. Based on the first extra MBS-DATA-IE, the MS may further know the location of the MBS-MAP 218 and enter operation of receiving following MBS data transmitted on the logical channel LC0.

Therefore, after reading the first extra MBS-DATA-IE in the MBS-MAP 228, the MS may be in an idle mode until receiving the MBS-MAP 218 to read. The MS does not need to keep searching for the next MBS-DATA-IE for the logical channel LC0 until it reads the original MBS-DATA-IE in the MBS-MAP 218. In this way, the MS spends less time in acquiring MBS-MAP synchronization and, therefore, operation overhead is reduced.

If the MS further missed the first extra MBS-DATA-IE in the MBS-MAP 228, the MS may search for a next MBS-DATA-IE for the logical channel LC0 in the data frames 202, until it reads the MBS-MAP-IE 234 in the data frame 202-5. Based on the MBS-MAP-IE 234, the MS may read the MBS-MAP 232 including the second extra MBS-DATA-IE. Based on the second extra MBS-DATA-IE, the MS may further know the location of the MBS-MAP 218 and enter operation of receiving following MBS data transmitted on the logical channel LC0.

Therefore, after reading the second extra MBS-DATA-IE in the MBS-MAP 232, the MS may be in an idle mode until receiving the MBS-MAP 218 to read. Again, the MS does not need to keep searching for the next MBS-DATA-IE for the logical channel LC0 until it reads the original MBS-DATA-IE in the MBS-MAP 218. In this way, the MS spends less time in acquiring MBS-MAP synchronization and, therefore, operation overhead is reduced.

In one exemplary embodiment, shown in FIG. 2G, the first extra MBS-DATA-IE in the MBS-MAP 228 indicates in the data frames 202 the location of the MBS-MAP 218, and the second extra MBS-MAP-IE in the MBS-MAP 232 indicates a location of an MBS-MAP (not shown) relating to the logical channel LC0 and next to the MBS-MAP 218.

As a result, if the MS missed the first extra MBS-DATA-IE in the MBS-MAP 228, the MS may search for a next MBS-DATA-IE for the logical channel LC0 in the data frames 202, until it reads the MBS-MAP-IE 234 in the data frame 202-5. Based on the MBS-MAP-IE 234, the MS may read the MBS-MAP 232 including the second extra MBS-DATA-IE. Based on the second extra MBS-DATA-IE, the MS may further know the location of the MBS-MAP relating to the logical channel LC0 and next to the MBS-MAP 218, and enter operation of receiving following MBS data transmitted on the logical channel LC0.

Therefore, after reading the second extra MBS-DATA-IE in the MBS-MAP 232, the MS may read the data burst 222, and enter an idle mode until receiving the MBS-MAP relating to the logical channel LC0 and next to the MBS-MAP 218. In this way, the MS spends less time in acquiring MBS-MAP synchronization and, therefore, operation overhead is reduced.

In one exemplary embodiment, shown in FIG. 2H, the first extra MBS-DATA-IE in the MBS-MAP 228 indicates in the data frames 202 a location of the MBS-MAP 232, and the second extra MBS-DATA-IE in the MBS-MAP 232 indicates the location of the MBS-MAP 218.

As a result, if the MS missed the first original MBS-DATA-IE in the MBS-MAP 216, the MS may search for a next MBS-DATA-IE in the data frames 202, until it reads the MBS-MAP-IE 230 in the data frame 202-4. Based on the MBS-MAP-IE 230, the MS may read the MBS-MAP 228 including the first extra MBS-DATA-IE. Based on the first extra MBS-DATA-IE, the MS may read the data burst 242 including, e.g., the retransmission of the data burst 220.

In addition, also based on the first extra MBS-DATA-IE, the MS may know the location of the MBS-MAP 232 including the second extra MBS-DATA-IE. Based on the second extra MBS-DATA-IE, the MS may read the data burst 244 including, e.g., the redundancy data used for error detection. The MS may further know the location of the MBS-MAP 218 and enter operation of receiving following MBS data transmitted on the logical channel LC0.

Therefore, if the MS missed the MBS-MAP-IE 212, the MS does not need to keep searching for the next MBS-DATA-IE for the logical channel LC0 until it reads the original MBS-DATA-IE in the MBS-MAP 218. In this way, the MS spends less time in performing MBS-MAP synchronization and, therefore, operation overhead is reduced. Furthermore, the MS receives the additional information regarding the MBS by receiving the MBS data bursts 242 and 244.

However, the MS may not receive the additional information in the MBS data bursts 242 and 244 if the MS does not need the additional information. For example, if the MS acquired MBS-MAP synchronization by reading the MBS-MAP-IE 212 and the MBS-MAP 216, the MS may know the location of the MBS-MAP 218. Therefore the MS would be in an idle mode until receiving the MBS-MAP 218 to read.

If the MS further missed the first extra MBS-DATA-IE in the MBS-MAP 228, the MS may search for a next MBS-DATA-IE for the logical channel LC0 in the data frames 202, until it reads the MBS-MAP-IE 234 in the data frame 202-5.

Based on the MBS-MAP-IE 234, the MS may read the MBS-MAP 232 including the second extra MBS-DATA-IE. Based on the second extra MBS-DATA-IE, the MS may further know the location of the MBS-MAP 218 and enter operation of receiving following MBS data transmitted on the logical channel LC0.

Therefore, when reading the second extra MBS-DATA-IE in the MBS-MAP 232, the MS has acquired MBS-MAP synchronization. Again, the MS does not need to keep searching for the next MBS-DATA-IE for the logical channel LC0 until it reads the original MBS-DATA-IE in the MBS-MAP 218. In this way, the MS spends less time in performing MBS-MAP synchronization and, therefore, operation overhead is reduced.

Figure 3:
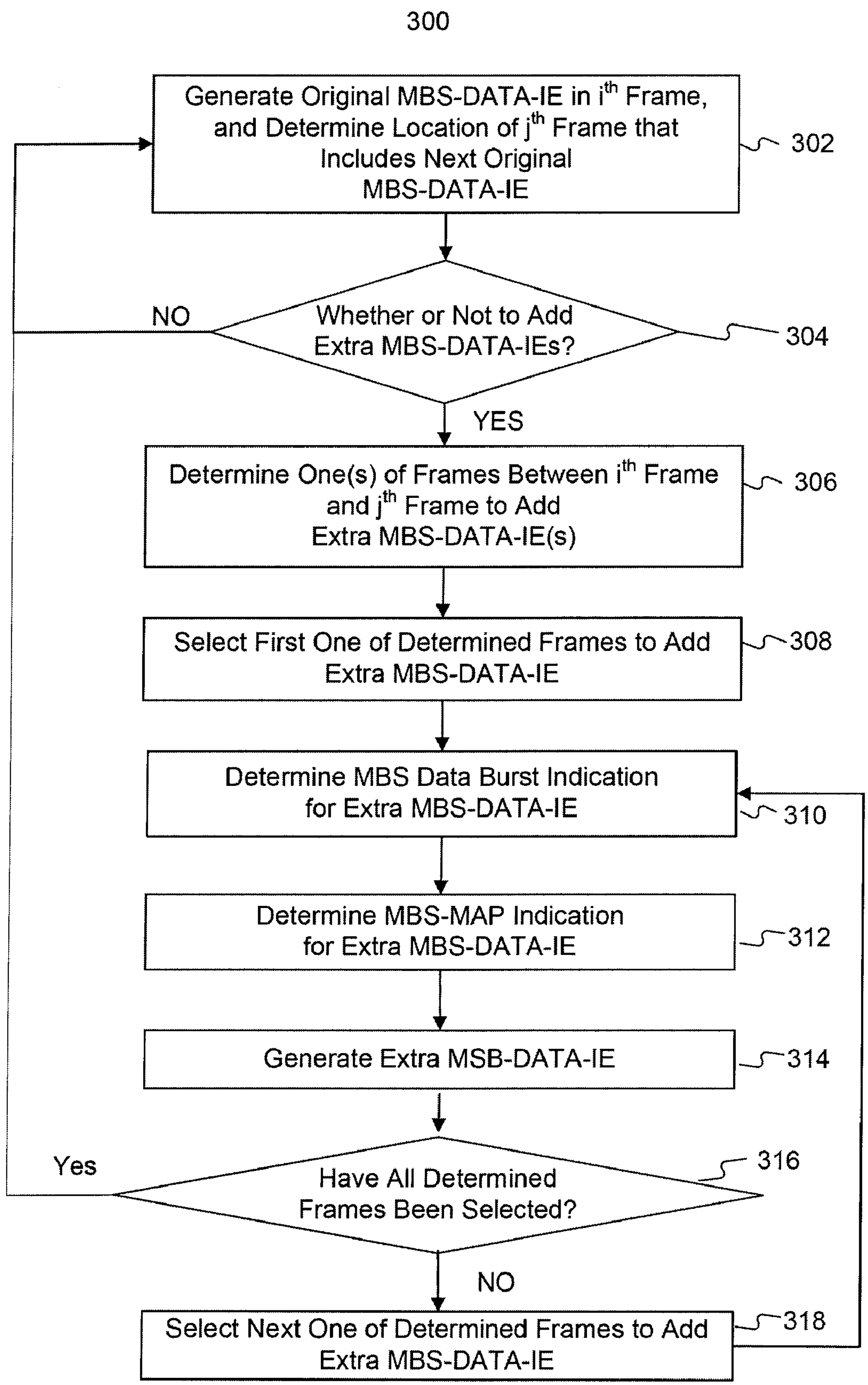
FIG. 3 is a flow chart of a method for a communication system to add extra MBS-DATA-IEs in data frames, according to an exemplary embodiment.

FIG. 3 is a flow chart of a method 300 for the communication system to add the extra MBS-DATA-IEs for the logical channel LC0 in the data frames, according to an exemplary embodiment. As noted above, the communication system may determine the data transmission schedule for MBS data to be transmitted on the plurality of logical channels, and generate the data frames based on the schedule. The communication system may also generate an original MBS-DATA-IE for the logical channel LC0 in an MBS-MAP included in a current one, e.g. an $i^{th}$ one, of the data frames, and determines a location of a next one, e.g., a $j^{th}$ one, of the data frames that includes a next original MBS-DATA-IE for the logical channel LC0, based on the schedule (step 302).

The communication system then determines whether one or more extra MBS-DATA-IEs for the logical channel LC0 need to be added in one(s) of the data frames between the $i^{th}$ data frame and the $j^{th}$ data frame (step 304). For example, if the communication system determines that the number of the data frames between the $i^{th}$ data frame and the $j^{th}$ data frame is relatively large, the communication system may decide to add the one or more extra MBS-DATA-IEs for the MS to reduce MBS-MAP synchronization time. Also for example, if the communication system decides to transmit additional information, such as data previously transmitted or redundancy data used for error detection in previously transmitted data, the communication system may decide to add the one or more extra MBS-DATA-IEs.

If the communication system determines there is no need to add the one or more extra MBS-DATA-IEs, the $j^{th}$ data frame becomes the current data frame. The communication system generates an original MBS-DATA-IE for the logical channel LC0 in the $j^{th}$ data frame, and steps 302 and 304 are repeated. If the BS determines there is the need to add the one or more extra MBS-DATA-IEs, the communication system further determines one(s) of the data frames between the $i^{th}$ data frame and the $j^{th}$ data frame, based on the method described above and illustrated in FIGS. 2A and 2B (step 306).

The communication system then selects a first one of the determined data frames to add a first one of the one or more extra MBS-DATA-IEs (step 308). The communication system determines data burst indication for the first one of the one or more extra MBS-DATA-IEs based on the method described above and illustrated in FIGS. 2C and 2D (step 310). For example, the communication system may determine the first one of the one or more extra MBS-DATA-IEs indicates no data burst. Also for example, the communication system may determine the first one of the one or more extra MBS-DATA-IEs indicates in the data frames a location of a data burst including additional information relating to data transmitted on the logical channel LC0. Further for example, the communication system may determine the first one of the one or more extra MBS-DATA-IEs indicates in the data frames a location of a data burst generated based on the schedule noted above.

The communication system also determines MBS-MAP indication for the first one of the one or more extra MBS-DATA-IEs, based on the method described above and illustrated in FIGS. 2E and 2F (step 312). For example, the communication system may determine that the first one of the one or more extra MBS-DATA-IEs indicates in the data frames a location of an MBS-MAP in the $j^{th}$ data frame. Also for example, the communication system may determine that the first one of the one or more extra MBS-DATA-IEs indicates in the data frames a location of an MBS-MAP that may include a next one of the extra MBS-DATA-IEs. Further for example, the communication system may determine that the first one of the one or more extra MBS-DATA-IEs indicates in the data frames a location of an MBS-MAP that includes an original MBS-DATA-IE for the logical channel LC0.

The communication system generates the first one of the one or more extra MBS-DATA-IEs based on the above MBS data burst indication and the MBS-MAP indication (step 314), and judges whether all of the determined data frames have been selected to add the one or more extra MBS-DATA-IEs (step 316). If all of the determined data frames have not been selected, the communication system selects a next one of the determined data frames, and steps 310-316 are repeated. Otherwise, the $j^{th}$ data frame becomes the current data frame. The communication system generates an original MBS-DATA-IE for the logical channel LC0 in the $j^{th}$ data frame, and steps 302 and 304 are repeated.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for providing a multicast and broadcast service (MBS) by transmitting a plurality of data frames in a wireless network, the method comprising:

generating, by a first apparatus comprising one of a base station or an Access Service Network Gateway (ASN-GW), a first MBS data information element (MBS-DATA-IE) in a first one of the data frames, the first MBS-DATA-IE including information relating to a logical channel of the MBS, and indicating a location of an MBS map (MBS-MAP) in a second one of the data frames;

determining, by the first apparatus, ones of the data frames between the first and second ones of the data frames in which to add a plurality of extra MBS-DATA-IEs; and generating, by the first apparatus, the extra MBS-DATA-IEs, the extra MBS-DATA-IEs being generated in the determined ones of the data frames and including information relating to the logical channel, wherein each of the extra MBS-DATA-IEs is generated in any of the MBS-MAPs that does not include the first MBS-DATA-IE for the logical channel.

2. The method of claim 1, wherein the first MBS-DATA-IE indicates a location of a data burst in the data frames.

3. The method of claim 1, further comprising generating a second MBS-DATA-IE in the second one of the data frames, the second MBS-DATA-IE indicating a location of a data burst in the data frames.

4. The method of claim 1, further comprising generating a second MBS-DATA-IE in the second one of the data frames, the second MBS-DATA-IE indicating in the data frames a location of a next MBS-MAP including information relating to the logical channel.

5. The method of claim 1, wherein the extra MBS-DATA-IEs include connection identifiers for the logical channel.

6. The method of claim 1, further comprising determining that a first one of the extra MBS-DATA-IEs indicates no data burst in the data frames.

7. The method of claim 1, further comprising determining that a first one of the extra MBS-DATA-IEs indicates a location of a data burst in the data frames.

8. The method of claim 1, further comprising adding additional information relating to data transmitted on the logical channel as a data burst in the data frames.

9. The method of claim 8, wherein the additional information includes data previously transmitted on the logical channel.

10. The method of claim 8, wherein the additional information includes redundancy data for correcting transmission errors in data previously transmitted on the logical channel.

11. The method of claim 8, further comprising determining that a first one of the extra MBS-DATA-IEs indicates a location of the data burst in the data frames.

12. The method of claim 1, further comprising determining that a first one of the extra MBS-DATA-IEs indicates the location of the MBS-MAP in the data frames.

13. The method of claim 1, wherein the MBS-MAP is a first MBS-MAP, the method further comprising determining that a first one of the extra MBS-DATA-IEs indicates in the data frames a location of a second MBS-MAP, the second MBS-MAP including a second one of the plurality of extra MBS-DATA-IEs.

14. The method of claim 13, wherein the second one of the plurality of extra MBS-DATA-IEs indicates the location of the first MBS-MAP in the data frames.

15. A method for providing a multicast and broadcast service (MBS) by transmitting a plurality of data frames in a wireless network, the method comprising:

generating, by a first apparatus comprising one of a base station or an Access Service Network Gateway (ASN-GW), a first MBS data information element (MBS-DATA-IE) in a first one of the data frames, the first MBS-DATA-IE including information relating to a logical channel of the MBS, and indicating a location of an MBS map (MBS-MAP) in a second one of the data frames; and generating, by the first apparatus, an extra MBS-DATA-IE in a third one of the data frames between the first and second ones of the data frames, the extra MBS-DATA-IE including information relating to the logical channel, wherein the extra MBS-DATA-IE is generated in any of the MBS-MAPs that does not include the first MBS-DATA-IE for the logical channel.

16. The method of claim 15, wherein the first MBS-DATA-IE indicates a location of a data burst in the data frames.

17. The method of claim 15, further comprising generating a second MBS-DATA-IE in the MBS-MAP, wherein the second MBS-DATA-IE indicates a location of a data burst in the data frames.

18. The method of claim 15, wherein the extra MBS-DATA-IE includes a connection identifier for the logical channel.

19. The method of claim 15, further comprising determining that the extra MBS-DATA-IE indicates no data burst in the data frames.

20. The method of claim 15, further comprising determining that the extra MBS-DATA-IE indicates a location of a data burst in the data frames.

21. The method of claim 15, further comprising adding additional information relating to data transmitted on the logical channel as a data burst in the data frames.

22. The method of claim 21, wherein the additional information includes data previously transmitted on the logical channel.

23. The method of claim 21, wherein the additional information includes redundancy data for correcting transmission errors in data previously transmitted on the logical channel.

24. The method of claim 21, further comprising determining that the extra MBS-DATA-IE indicates a location of the data burst in the data frames.

25. The method of claim 15, further comprising determining that the extra MBS-DATA-IE indicates the location of the MBS-MAP in the data frames.

26. A communication system for providing a multicast and broadcast service (MBS) by transmitting a plurality of data frames in a wireless network, the system comprising a processor, the processor being configured to:

generate a first MBS data information element (MBS-DATA-IE) in a first one of the data frames, the first MBS-DATA-IE including information relating to a logical channel of the MBS, and indicating a location of an MBS map (MBS-MAP) in a second one of the data frames;

determine ones of the data frames between the first and second ones of the data frames to add a plurality of extra MBS-DATA-IEs; and generate the extra MBS-DATA-IEs, each of the extra MBS-DATA-IEs being generated in one of the determined ones of the data frames and including information relating to the logical channel, wherein each of the extra MBS-DATA-IEs is generated in any of the MBS-MAPs that does not include the first MBS-DATA-IE for the logical channel.

27. The system of claim 26, wherein the system is a base station.

28. The system of claim 26, wherein the system is an Access Service Network Gateway (ASN-GW).

29. A non-transitory computer-readable storage medium including instructions, executable by a processor in a communication system, for performing a method for providing a multicast and broadcast service (MBS) by transmitting a plurality of data frames in a wireless network, the method comprising:

generating a first MBS data information element (MBS-DATA-IE) in a first one of the data frames, the first MBS-DATA-IE including information relating to a logical channel of the MBS, and indicating a location of an MBS map (MBS-MAP) in a second one of the data frames;

determining ones of the data frames between the first and second ones of the data frames in which to add a plurality of extra MBS-DATA-IEs; and generating the extra MBS-DATA-IEs, the extra MBS-DATA-IEs being generated in the determined ones of the data frames and including information relating to the logical channel, wherein each of the extra MBS-DATA-IEs is generated in any of the MBS-MAPs that does not include the first MBS-DATA-IE for the logical channel.

30. a method for providing a multicast and broadcast service (MBS) by transmitting a plurality of data frames in a wireless network, the method comprising:

generating, by a first apparatus comprising one of a base station or an Access Service Network Gateway (ASN-GW), a first MBS data information element (MBS-DATA-IE) in a first one of the data frames, the first MBS-DATA-IE including information relating to a logical channel of the MBS;

generating, by the first apparatus, a second MBS data information element (MBS-DATA-IE) in a second one of the data frames, the second one of the data frames containing an MBS map (MBS-MAP) indicated by the first data frame; and generating, by the first apparatus, an extra MBS-DATA-IE in a data frame between the first and second ones of the data frames and including information relating to the logical channel, wherein the extra MBS-DATA-IE is generated in any of the MBS-MAPs that does not include the first MBS-DATA-IE for the logical channel.

31. The method of claim 30, wherein the wireless network includes a mobile station configured to receive data transmitted on the logical channel, the method further comprising:

generating the extra MBS-DATA-IE to reduce time for the mobile station to perform MBS-MAP synchronization.

32. The method of claim 30, wherein the wireless network includes a mobile station configured to receive data transmitted on the logical channel, the method further comprising:

generating the extra MBS-DATA-IE to save power for the mobile station to perform MBS-MAP synchronization.

33. The method of claim 30, wherein the extra MBS-DATA-IE is generated to transmit additional information on the logical channel of the MBS.

34. The method of claim 33, wherein the extra MBS-DATA-IE is generated to transmit data previously transmitted on the logical channel of the MBS.

35. The method of claim 33, wherein the extra MBS-DATA-IE is generated to transmit redundancy data used for error detection in data previously transmitted on the logical channel of the MBS.

* * * * *

UNITED STATES PATENT AND TRADEMARK OFFICE

CERTIFICATE OF CORRECTION

PATENT NO. : 8,139,580 B2
APPLICATION NO. : 12/260217
DATED : March 20, 2012
INVENTOR(S) : You-Lin Chen, Jen-Shun Yang and Shiao-Li Tsao It is certified that error appears in the above-identified patent and that said Letters Patent is hereby corrected as shown below:

Claim 30, col. 13, line 7, “a method” should read --A method--.

Signed and Sealed this
Twenty-ninth Day of May, 2012

David J. Kappos
*Director of the United States Patent and Trademark Office*